(12) United States Patent
Kjeldsen

(10) Patent No.: US 7,802,960 B2
(45) Date of Patent: Sep. 28, 2010

(54) DEVICE AND METHOD FOR SUCTION PIPE

(75) Inventor: Morten Kjeldsen, Sola (NO)

(73) Assignee: Troms Kraft Produksjon AS, Tromsø (NO)

( * ) Notice: Subject to any disclaimer, the term of this patent is extended or adjusted under 35 U.S.C. 154(b) by 743 days.

(21) Appl. No.: 11/577,004

(22) PCT Filed: Oct. 18, 2005

(86) PCT No.: PCT/NO2005/000391

§ 371 (c)(1),
(2), (4) Date: Apr. 26, 2007

(87) PCT Pub. No.: WO2006/043824

PCT Pub. Date: Apr. 27, 2006

(65) Prior Publication Data

US 2008/0063510 A1    Mar. 13, 2008

(30) Foreign Application Priority Data

Oct. 18, 2004    (NO) ................................. 20044391

(51) Int. Cl.
F03B 11/04    (2006.01)
F03B 15/04    (2006.01)
F04D 29/40    (2006.01)
(52) U.S. Cl. ........................... 415/1; 415/116; 415/119; 415/144
(58) Field of Classification Search ............... 415/1, 415/116, 119, 144, 211.2, 914; 60/696
See application file for complete search history.

(56) References Cited

U.S. PATENT DOCUMENTS

| 2,507,796 A | * | 5/1950 | Martin ........................ 415/144 |
| 3,041,848 A |   | 7/1962 | Greenwald |
| 4,515,524 A |   | 5/1985 | Fisher |

FOREIGN PATENT DOCUMENTS

| JP | 55 156274 A | * | 12/1980 |
| JP | 61 178563   |   | 8/1986 |
| JP | 63 088278 A | * | 4/1988 |
| JP | 02 067467 A | * | 3/1990 |

OTHER PUBLICATIONS

Vekve, "An experimental investigation of draft tube flow", NTNU2004:36.
Idelchik et al, "Handbook of hydraulic resistance, 3rd Ed." p. 532-582 (02).

* cited by examiner

*Primary Examiner*—Edward Look
*Assistant Examiner*—Jesse Prager
(74) *Attorney, Agent, or Firm*—Christian Abel

(57) ABSTRACT

A method and device for reducing noise and vibrations in a suction pipe (1) in a reaction-type hydropower turbine. The suction pipe (1) comprises one or more nozzles (2) for injection of a working medium through the nozzles (2) into the suction pipe (1). Each nozzle is arranged at an angle γ relative to a horizontal plane perpendicular to the longitudinal axis (4) of an inlet (3) of the suction pipe (1) and at an angle β relative to a horizontally defined tangent (6) at the point of intersection between each nozzle (2) and the suction pipe (1).

22 Claims, 5 Drawing Sheets

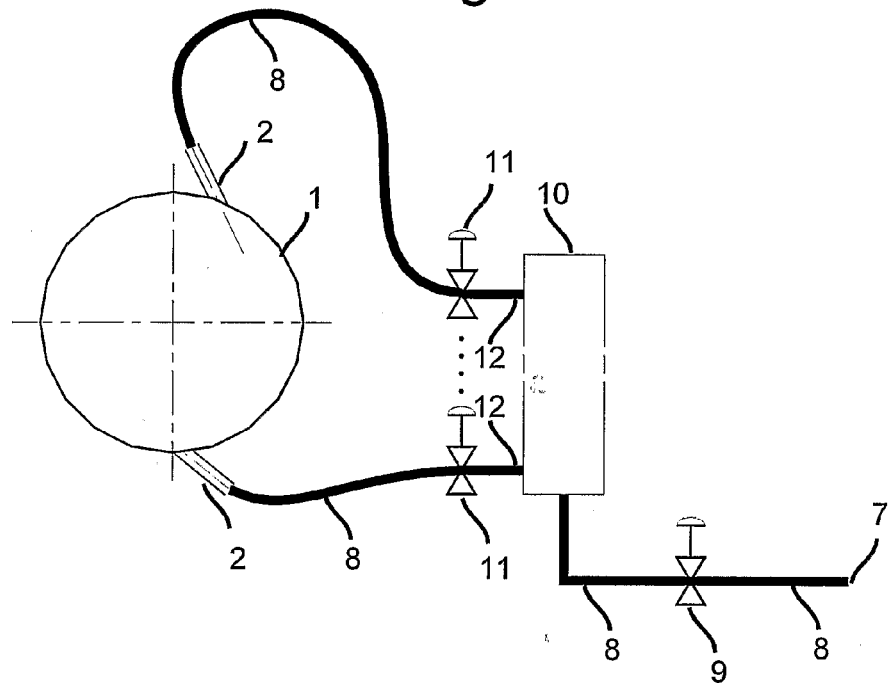
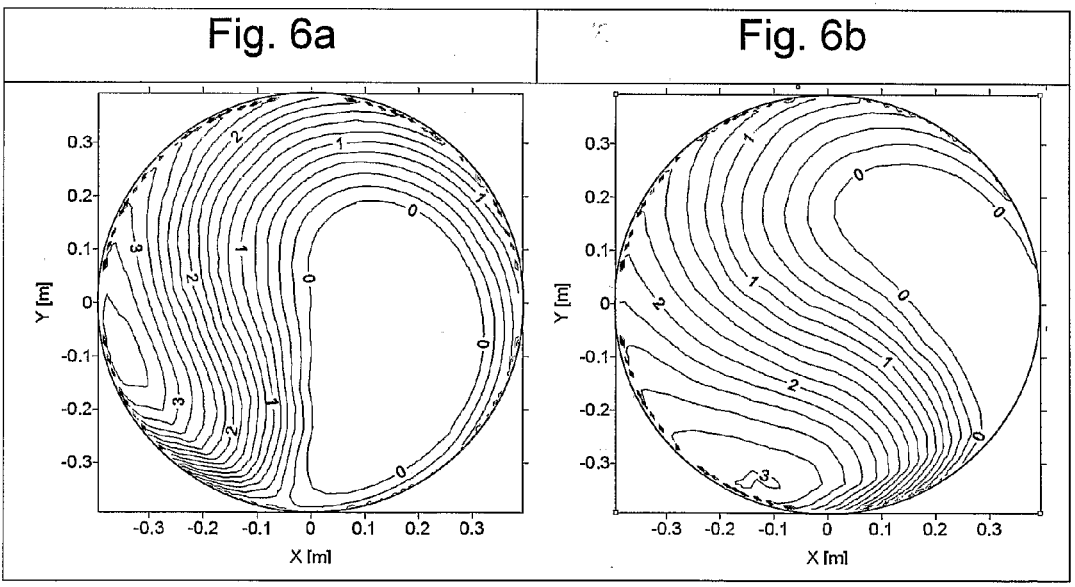

DEVICE AND METHOD FOR SUCTION PIPE

TECHNICAL FIELD

The present invention relates to a device and a method for reducing noise and vibrations in a suction pipe in a reaction-type hydropower turbine. The invention is achieved by injecting water into the suction pipe through a finite number of points along the suction pipe's periphery. The injected water can be controlled, thereby counteracting back-flow tendencies, which are an important cause of unsteady phenomena that result in noise and vibrations in the suction pipe.

PRIOR ART

Reaction-type hydropower turbines include Francis, Kaplan and bulb turbines. This kind of turbine plant can be briefly described by following the movement of the water, beginning with an intake, shut-off devices such as sluice gates and valves, turbine cylinder, stationary vane cascades, such as stay and guide vanes, impeller or turbine wheel, suction pipe and an outlet. The function of the suction pipe is to utilise the water's velocity at the turbine wheel outlet in such a manner that it is recreated as head at the suction pipe outlet. This will permit the total pressure drop over the turbine plant to be increased together with the power produced.

Reaction-type turbines are extremely common in Norwegian hydropower production. They are characterised by high efficiency near the optimised operating point for which the turbine is designed. In the case of production below the operating point, the flow in the suction pipe under the turbine will become unstable. This instability is due amongst other things to the induced velocity field from the turbine wheel in the suction pipe inlet. This field will give rise to rotating eddies in the flow of water, resulting in unsteady effects and leading to noise and vibrations. Noise is mainly a problem for operators in the vicinity of the turbine system. The vibrations, however, have a direct effect on the working life of the turbine system, through increased fatigue loadings and material fatigue. The unsteady effects are discussed in the thesis "An experimental investigation of draft tube flow" by Thomas Velkve, NTNU 2004:36.

Unstable flows will also arise on account of the flow's separation from the walls of the suction pipe. This separation, which is a known phenomenon in fluid-mechanics, will give rise to unsteady effects involving back-flow.

For flow systems in general and turbine systems in particular, the performance or efficiency is often determined by changes in the interface between the fluid and the walls of the flow object. One method of stabilising the interface and preventing or delaying separation of the said interface is to add more impulse to the interface through injection of fluid, use of vortex generators or providing a rough surface, for example like that of a golf ball, in order thereby to increase the mixing between the interface and the flow outside the same interface.

The method of injecting the working medium on the low pressure side of a rotating machine is previously known for compressors in order to achieve favourable effects with regard to delivered amount and head, see U.S. Pat. No. 3,041,848. It should be noted that a known technique in pump operation is to recirculate water from the high pressure side, choke the pressure, for example via a valve, and introduce the water at the inlet on the pump's suction pipe, with the result that the pump operates with a volume flow approaching the optimum.

Injection of working medium into the flow interface in order to control separation in short diffusers is also known, see "Handbook of Hydraulic Resistance", Idelchik, 3. edition, 1994, p. 260. The principle of improving the performance of short suction pipes or diffusers is also the main object of U.S. Pat. No. 4,515,524. A hydraulic recirculation line is employed here to prevent separation on a suction pipe for reaction turbines. The said device, however, will only have an effect on flows without tangential velocity components, and is therefore not relevant for low load ranges on turbines possessing this very characteristic of the presence of tangential velocity components.

The publication JP 61178563 discloses another example of the prior art, where water is fed into the suction pipe through openings in the suction pipe wall. The openings have an angle of entrance α (FIG. 1) relative to a horizontal plane through the suction pipe. Introducing water through these openings will not counteract vibrations and noise when production is low.

The main object of the present invention is to reduce noise and vibrations in a suction pipe by injecting a working medium into the suction pipe at low operating ranges. There is preferably no injection when the flow of water is close to the optimal operating point for the suction pipe or the turbine system. Thus it is an object of the present invention to increase the range of possible water flows for operation of the turbine.

SUMMARY OF THE INVENTION

The present invention provides a device for reducing noise and vibrations in a suction pipe in a reaction-type hydropower turbine, where the suction pipe comprises at least one nozzle for injection of a working medium through the nozzles into the suction pipe, where each nozzle is arranged at an angle γ relative to a horizontal plane perpendicular to the longitudinal axis of an inlet of the suction pipe, characterised in that each nozzle is at an angle β relative to a horizontally defined tangent at the point of intersection between each nozzle and the suction pipe.

The present invention also relates to a method for reducing noise and vibrations in a suction pipe in a reaction-type hydropower turbine, characterised in that it comprises the following step:

a) injection of a working medium through at least one nozzle provided in the suction pipe, where each nozzle is arranged at an angle γ relative to a horizontal plane perpendicular to the longitudinal axis of an inlet in the suction pipe and at an angle β relative to a horizontally defined tangent at the point of intersection between each nozzle and the suction pipe.

Preferred embodiments of the invention will become apparent from the dependent patent claims.

BRIEF DESCRIPTION OF THE DRAWINGS

The present invention will now be described by means of an embodiment, where reference is made to the attached drawings:

FIG. 4a illustrates a cross section of a nozzle, while

FIG. 5 illustrates the control part of the invention. The system is shown here with 2 nozzles (N=2).

FIGS. 6a and b show the extent of back-flows as calculated by means of numerical flow calculation instruments.

SURVEY OF PARAMETERS USED IN FIGURES AND TEXT

D Hydraulic diameter. Also used as a measurement of the minimum cross section A, since hydraulic diameter is defined as $D=4A/P$, where A is the minimum cross section and P is wetted circumference. For a circular, minimum cross section, $A=\pi D^2/4$, while $P=\pi D$, so that $D=D$.

Du Outlet diameter of turbine impeller, and the suction pipe's inlet diameter.

N Number of nozzles dispersed along the periphery of the suction pipe.

s Vertical distance from the suction pipe's inlet to intersection between nozzles and suction pipe.

si Individual vertical distance for nozzle number i.

$\alpha$ The angle in the horizontal plane between adjacent nozzles.

$\alpha 1$ Angle between nozzles number 1 and 2 in the horizontal plane.

$\alpha i$ Angle between nozzle numbers i and i+1 in the horizontal plane. If i=N, nozzle number i+1 will be identical to nozzle number 1.

$\beta$ The angle the centre line on the nozzle forms with the tangent to the suction pipe in the horizontal plane.

$\beta 1$ $\beta$ angle for nozzle number 1

$\beta i$ $\beta$ angle for nozzle number i $\gamma$ The angle the centre line on the nozzle forms with the tangent to the suction pipe in the vertical plane.

$\gamma i$ $\gamma$ angle for nozzle number i.

The horizontal plane is defined as the plane that has the turbine's shaft centre as surface perpendicular.

The vertical plane is defined as the horizontal plane rotated 90 degrees about a line perpendicular to the turbine's shaft centre.

It should be noted that in most cases the turbine's shaft centre will coincide with the central longitudinal axis of the suction tube inlet under the turbine.

DETAILED DESCRIPTION OF THE INVENTION

Figure 1:
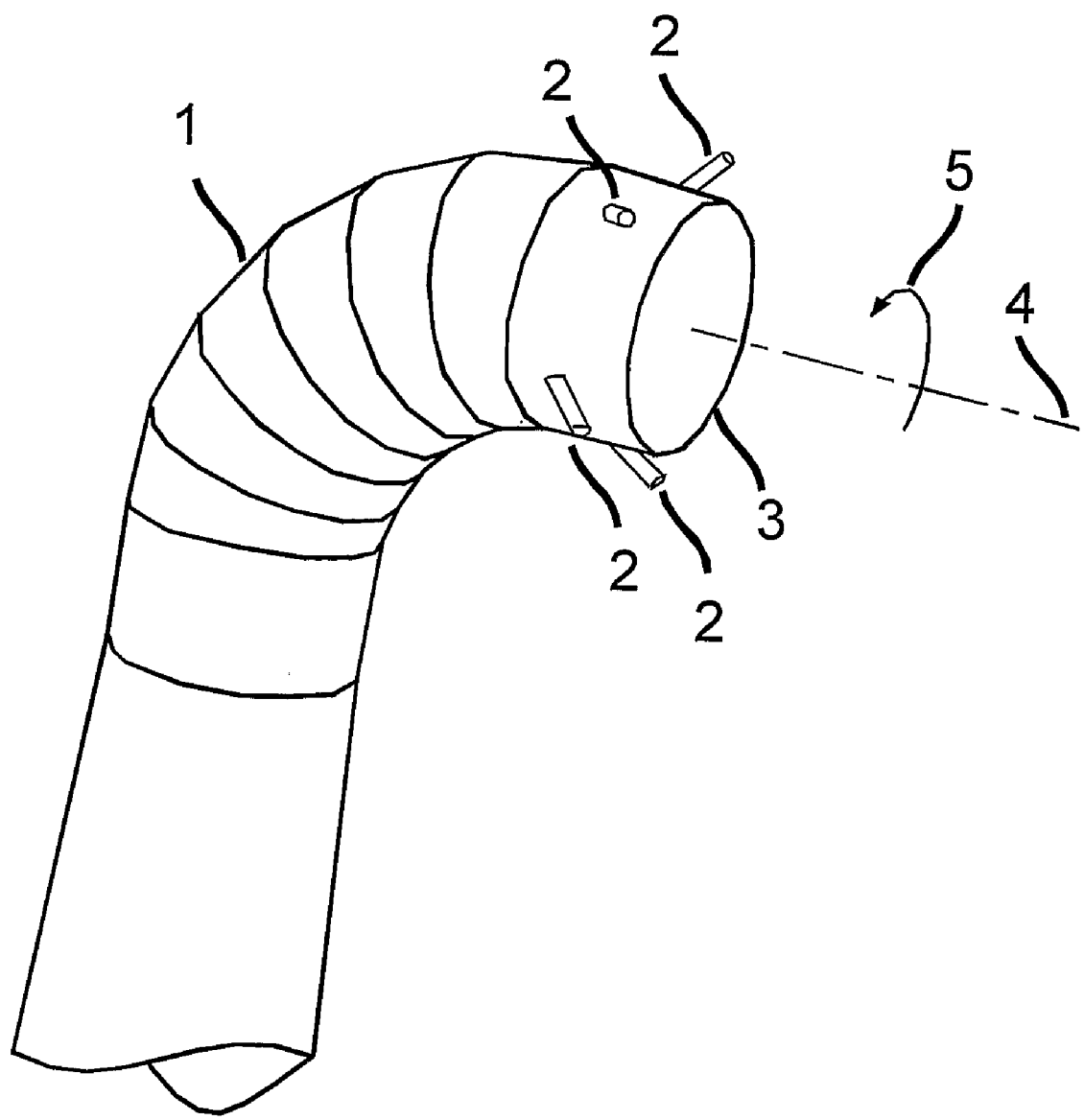
FIG. 1 is a general drawing of a suction pipe, where nozzles are mounted along the periphery. The suction pipe illustrated is typically welded together from curved steel plates, but could be cast or produced in other ways. The system is illustrated with 5 nozzles (N=5).

The suction pipe injection system is illustrated in FIG. 1. It consists of an N number of nozzles 2 mounted on a suction pipe 1. The nozzles 2 are mounted so as to form the angles $\beta$, and $\gamma$, see FIGS. 2 and 3, with tangential line 6 at the point of intersection between the nozzles 2 and the suction pipe 1 in a horizontal and a vertical plane respectively when the turbine axis 4 defines the vertical direction. The turbine axis thereby defines the surface perpendicular to the horizontal plane. For values of $\beta$ between 0 and 90 degrees, the nozzles 2 will inject the working medium against the turbine's direction of rotation 5.

Figure 2:
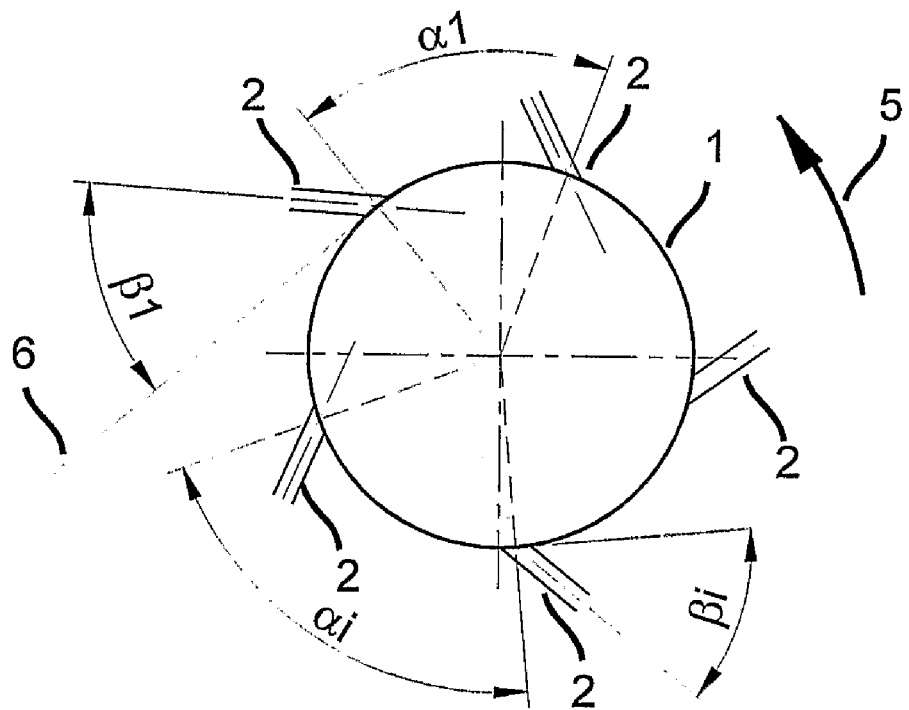
FIG. 2 shows parameters defining the nozzles' alignment when studied in the horizontal plane. The system is illustrated with 5 nozzles (N=5).
Figure 3:
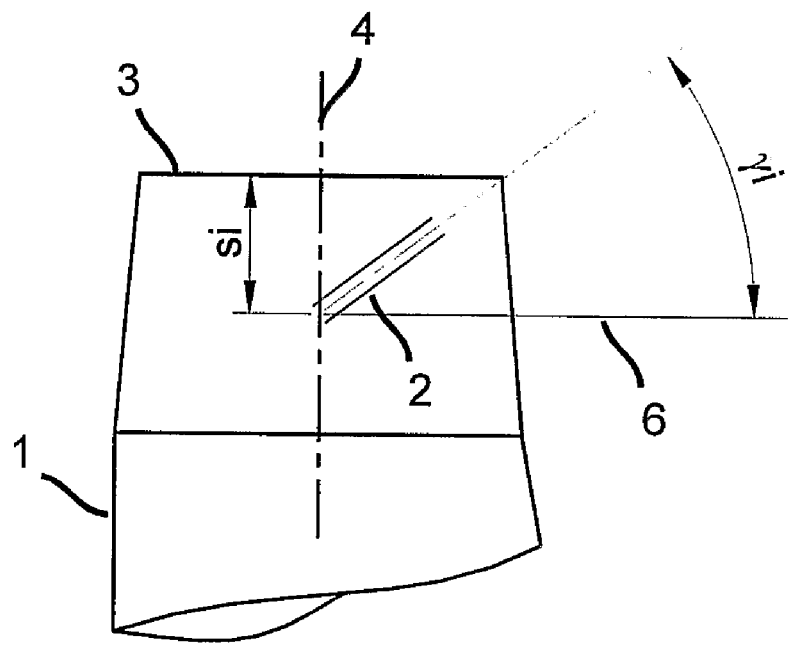
FIG. 3 shows parameters defining the nozzles' alignment when studied in the vertical plane.

The spacing between the individual nozzles 2 is defined by means of the angle $\alpha$, see FIG. 2. The number of nozzles N, the value of $\alpha$ and vertical spacing s between the suction pipe's 1 inlet 3 and the nozzles 2 are determined on the basis of measurements or fluidic analyses of the suction pipe with and without the suction pipe injection system.

The number of nozzles N is preferably between 1 and 7. This gives an angle $\alpha$ of 360° and 52° respectively, provided the spacing between all the nozzles is equal.

The angle $\gamma$ is preferably between 0° and 80°, where angles in the lower range are preferred in order to dampen low-load eddies in the centre of the suction pipe, while angles in the higher range are preferred in order to dampen separation and associated back-flows. The angle $\gamma$ is more preferred between 10° and 50°.

The angle $\beta$ is preferably between 20° and 70°, more preferred between 30° and 60°, and even more preferred approximately 40°. As mentioned above, this angle is preferably the opposite of the turbine's direction of rotation 5, in order to counteract tangential flow directions in the flow of water in the suction pipe.

The water injected through the nozzles 2 in the suction pipe preferably has an injection pressure lower than the pressure upstream of the turbine.

The injection of water through the nozzles 2 is preferably carried out continuously. It should be noted that the amount of water injected through the nozzles 2 according to the present invention should not exceed approximately 10% of the amount of water passing through the turbine.

Figure 4A:
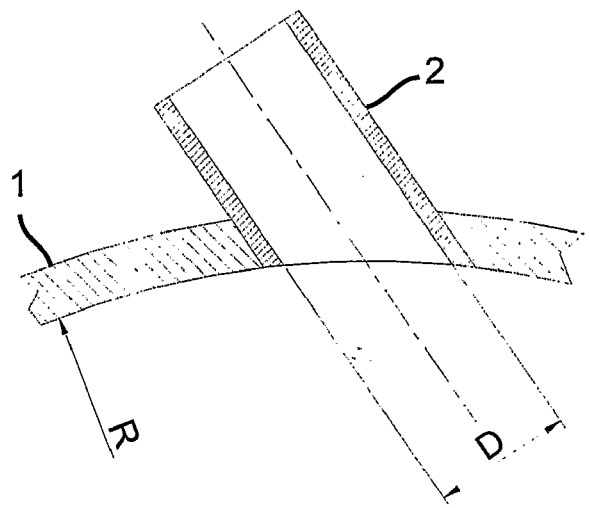
Figure 4B:
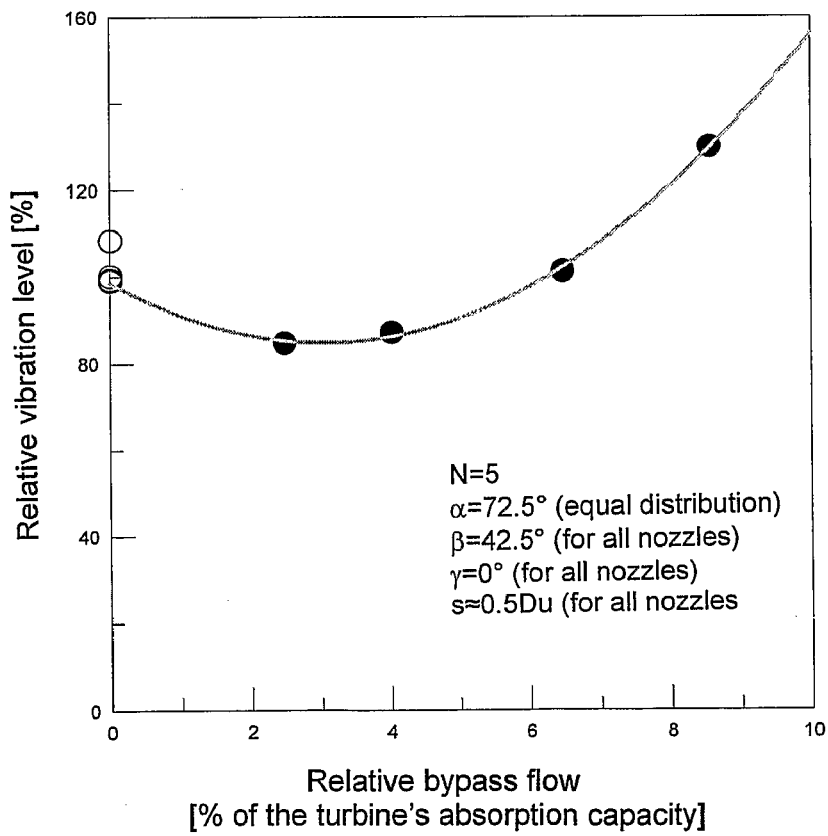
FIG. 4b shows that an optimal choice exists or may exist for flow rate through the nozzles.

In FIG. 4a details of the nozzle 2 are illustrated. Here the nozzle is in the form of a fixed pipe socket, and is characterised by a hydraulic diameter D. The hydraulic diameter of the nozzle is determined in such a manner that the minimum cross section is adapted to available head or amount of water upstream of the nozzle, but also to an optimal flow of water for controlling parameters $\alpha$, $\beta$, $\gamma$, N and s, see example in FIG. 4b. Internally in the suction pipe an optimal parameter combination will also be experienced as less tendency to back-flow and a reduction of maximum velocities through the cross section, see FIG. 6.

The object of the invention is to reduce noise and vibrations at low loadings, typically 30% of nominal output, but also greater than this. In the example in figure 4b a configuration is shown that acts on a turbine with a nominal output of 4 MW, a head of 150 meters water column and a rotational speed of 750 rpm.

FIG. 5 illustrates control bodies used for determining the amount of the turbine's working medium that flows through the nozzles 2. From an intake 7 the water passes through liquid-bearing transport devices 8, such as pipes and hoses, through a first control valve 9 mounted upstream of a distributor 10 which distributes the total injected amount of medium, corresponding to the working medium of the turbine, to the respective nozzle 2 through a number of connecting pipes 12 corresponding to the number N of nozzles 2 in the system. Between the distributor 10 and the nozzles 2 a new set of second, individual control valves 11 may be mounted. The control of the first and second control valves 9, 11 is performed continuously in order to optimise the pressure level of injection medium at the injection system's intake 7 with regard to the turbine's operating point at any time.

As mentioned above, the amount of water injected will preferably be zero at the optimal operating point for the turbine, while for lower operating points the amount of water injected will increase to 10% of the amount of water passing the turbine at the operating point concerned.

FIGS. 6a and b illustrate the extent of back-flows as calculated by means of numerical flow calculation instruments. For FIG. 6a a water flow of 20% of maximum loading and no injection apply, and for FIG. 6b a water flow of 20% and an injection of 4% of maximum loading. Injection is performed through 5 nozzles, while the angles γ=30° and β=45°.

The figures illustrate contour values and axial velocities through a section of the suction pipe, see FIG. 1, downstream of the injection points. The area within the contour line marked zero indicates back-flows, and this can be seen to decrease for the flow with injection. It is also worth noting that the highest velocity through the cross section is reduced in the case of injection, which is advantageous for the efficiency of the suction pipe and the turbine system. As mentioned at the beginning, the back-flow is one of the main reasons for unwanted noise and vibrations in the suction pipe, and it can be seen from the figures that these are now substantially reduced. The turbine can consequently also be operated in the operating range indicated above without risk of the material fatigue and wear that usually occur in this operating range.

It should be noted that in the test that was conducted and is described above in connection with FIG. 4, the people standing near the suction pipe noticed how the noise and vibrations were reduced on injection of water through the nozzles compared to when the injection of water through the nozzles ceased.

Figure 7:
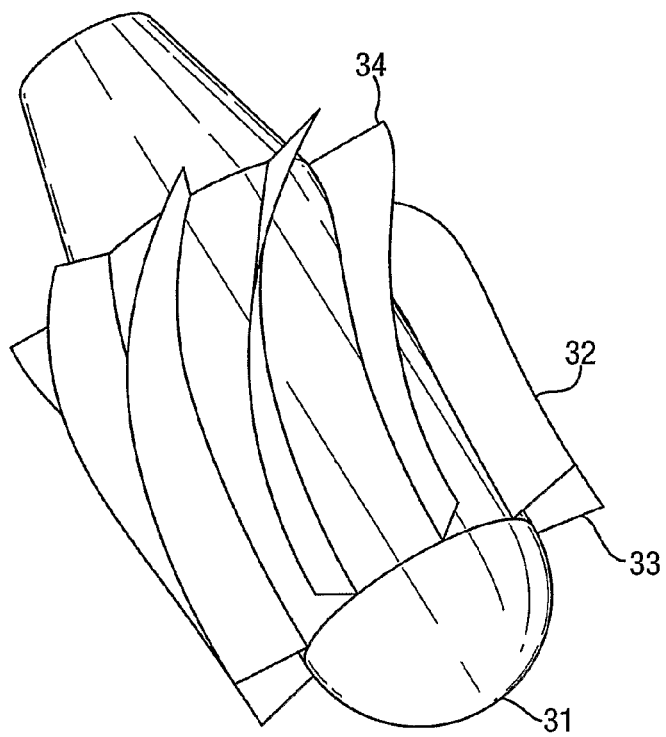
FIG. 7 illustrates a spinning element employed in an embodiment of the invention.
Figure 8:
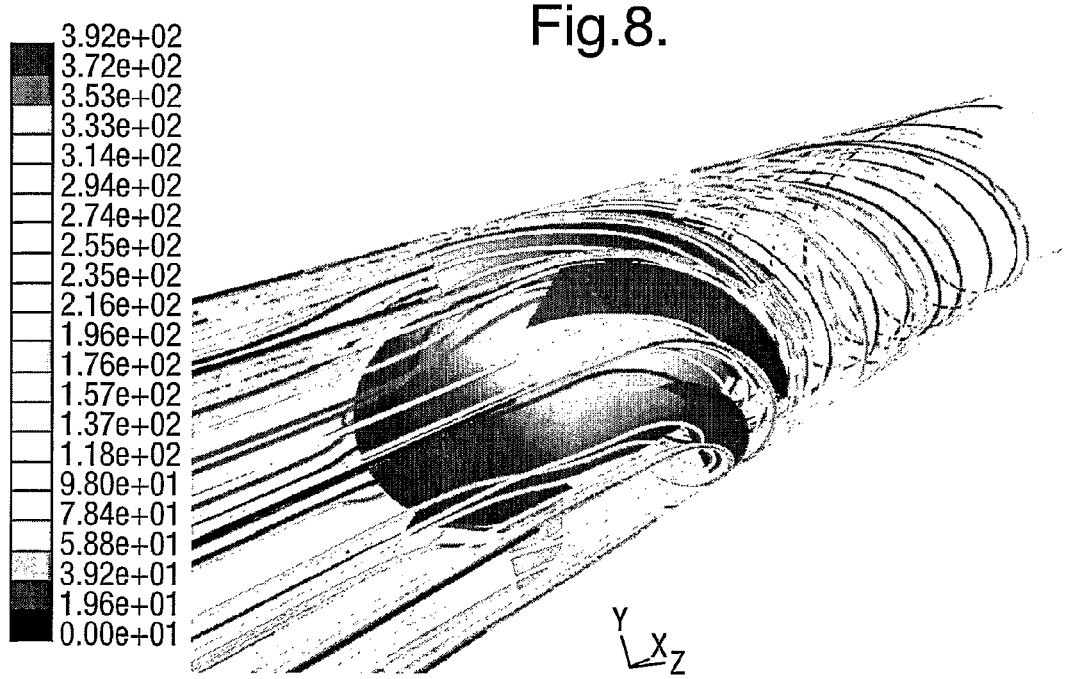
FIG. 8 illustrates how the spinning element changes the direction of the flow of water in the nozzle.

In the description above it is assumed that the injection of water is conducted in an approximately axial direction through the nozzles 2, i.e. that the flow of water has the same direction as the longitudinal direction of the nozzles 2. In an alternative embodiment it will be possible to place a spinning element near the outlet of the nozzles 2, thus changing the direction of the flow of water, with the result that in addition it obtains a tangential direction component, where axial direction is defined by the longitudinal direction of the nozzle, before the flow of water in the nozzles 2 reaches the main flow of water in the suction pipe. A spinning element of this kind is illustrated in FIG. 7. Here the spinning element comprises a centre body 31 with vanes 32 that supply the flow of water with the tangential direction component mentioned above. An illustration of the flow of water before and after the spinning element is shown in FIG. 8.

The spinning element's vanes 32 extend continuously along the outside of the centre body 31 and are therefore attached to the inside of the nozzles 2 along their outer edge. The vanes have an inlet edge 32 and an outlet edge 33, where the vane is curved along the longitudinal axis of the centre body, as illustrated in FIG. 7.

Many modifications and adaptations of the present invention will naturally be apparent to those skilled in the art, either by interpretation of the above detailed description of the invention or by practising the invention.

The above detailed description is presented particularly with the intention of illustrating and describing advantageous embodiments of the invention. The description, however, in no way limits the invention to the specific embodiments that are described in detail.

The design of the device according to the invention will naturally be dependent on the dimensions of the rest of the turbine system. The various parameters, such as the angles α (i.e. the number of nozzles), β and γ (i.e. horizontal and vertical angular orientation), s (i.e. the spacing between the suction pipe inlet and the nozzles) and whether the spinning element should be employed or not, must therefore be adapted to suit each turbine system.

The invention claimed is:

1. A device for reducing noise and vibrations in a suction pipe in a reaction-type hydropower turbine at low operating ranges, where the suction pipe comprises at least one nozzle for injection of a water through the nozzles into the suction pipe, where each nozzle is arranged at an angle γ between 5° and 80° relative to a horizontal plane perpendicular to the longitudinal axis of an inlet of the suction pipe,
   wherein -each nozzle is at an angle β between 20° and 70° relative to a horizontally defined tangent at the point of intersection between each nozzle and the suction pipe;
   wherein an amount of water injected is zero at the optimal operating point for the turbine, while for lower operating points the amount of water injected will increase to 10% of the amount of water passing the turbine at the operating point concerned.

2. A device according to patent claim 1,
   wherein the angle β is arranged so that the water is injected against the turbine's direction of rotation.

3. A device according to claim 1,
   wherein the angle β is preferably between 30° and 60°, and even more preferred approximately 40°.

4. A device according to claim 1,
   wherein the angle γ is preferably between 10° and 50°.

5. A device according to claim 1,
   wherein each nozzle is mounted along the periphery of the suction pipe spaced at equal distances apart.

6. A device according to claim 1,
   wherein each nozzle is mounted with a spacing from the suction pipe's inlet.

7. A device according to claim 1,
   wherein the total amount of water through the nozzles is controlled by means of a first control valve.

8. A device according to claim 1,
   wherein the individual amount of water through each nozzle is controlled by means of second control valves.

9. A device according to claim 1,
   wherein amount of water is controlled as a function of the suction pipe's instantaneous condition, or is controlled as a function of the turbine's load or the turbine's admission.

10. A device according to patent claim 9,
    wherein the suction pipe's instantaneous condition is represented by the pressure measured on the suction pipe wall downstream of the nozzles.

11. A device according to claim 1,
    wherein in some or each of the nozzles a spinning element is mounted that provides a spin in the flow passing the nozzles.

12. A method for reducing noise and vibrations in a suction pipe in a reaction-type hydropower turbine at low operating ranges,
    wherein it comprises the following step:
    a) injection of a water through at least one nozzle provided in the suction pipe, where each nozzle is arranged at an angle γ between 5° and 80° relative to a horizontal plane perpendicular to the longitudinal axis of an inlet in the suction pipe and at an angle β between 20° and 70° relative to a horizontally defined tangent at the point of intersection between each nozzle and the suction pipe;
    wherein an amount of water injected is zero at the optimal operating point for the turbine, while for lower operating points the amount of water injected will increase to 10% of the amount of water passing the turbine at the operating point concerned.

13. A method according to patent claim 12,
    wherein the angle β is arranged so that the water is injected against the turbine's direction of rotation.

14. A method according to claim 12,
    wherein the angle β is preferably between 30° and 60°, and even more preferred approximately 40°.

15. A method according to claim 12,
wherein the angle $\gamma$ is preferably between 10° and 50°.

16. A method according to claim 12,
wherein each nozzle is mounted along the periphery of the suction pipe spaced at equal distances apart.

17. A method according to claim 12,
wherein each nozzle is mounted with a spacing from the suction pipe's inlet.

18. A method according to claim 12,
wherein the total amount of water through the nozzles is controlled by means of a first control valve.

19. A method according to claim 12,
wherein the individual amount of water through each nozzle is controlled by means of second control valves.

20. A method according to claim 12,
wherein amount of water is controlled as a function of the suction pipe's instantaneous condition, or is controlled as a function of the turbine's load or the turbine's admission.

21. A method according to patent claim 20,
wherein the suction pipe's instantaneous condition is represented by the pressure measured on the suction pipe wall downstream of the nozzles.

22. A method according to claim 12,
wherein in some or each of the nozzles a spinning element is mounted that provides a spin in the flow passing the nozzles.

* * * * *